37-66
12/2/86 OR RE 32,297

United States Patent [19]

Oules

[11] E Patent Number: Re. 32,297

[45] Reissued Date of Patent: Dec. 2, 1986

[54] APPLIANCE FOR DREDGING THE BOTTOM OF A BODY OF WATER

[75] Inventor: Jacques Oules, Paris, France

[73] Assignee: Hydroconsult, S.A., Paris, France

[21] Appl. No.: 749,638

[22] Filed: Jun. 28, 1985

Related U.S. Patent Documents

Reissue of:

[64] Patent No.: 4,445,290
Issued: May 1, 1984
Appl. No.: 330,788
Filed: Dec. 14, 1981

[30] Foreign Application Priority Data

Dec. 16, 1980 [FR] France ..... 8026683

[51] Int. Cl.[4] ..... E02F 3/88

[52] U.S. Cl. ..... 37/66; 37/73; 37/195

[58] Field of Search ..... 37/67, 66, 64, 72, 73, 37/195

[56] References Cited

U.S. PATENT DOCUMENTS

| | | | |
|---|---|---|---|
| 1,019,610 | 3/1912 | Donnelly | 37/67 |
| 1,792,065 | 2/1931 | Bowers | 37/73 |
| 1,962,363 | 6/1934 | Reimel et al. | 37/73 X |
| 2,308,743 | 1/1943 | Buckley et al. | 37/73 X |
| 3,171,219 | 3/1965 | Kaufmann et al. | 37/67 X |
| 3,206,875 | 9/1965 | Cargile, Jr. | 37/67 |
| 3,218,739 | 11/1965 | Kaufmann et al. | 37/67 X |
| 3,495,409 | 2/1970 | Riedemann | 37/64 X |
| 3,591,936 | 7/1971 | Van Geuns | 37/73 X |
| 3,656,449 | 4/1972 | Mead | 37/73 X |
| 3,755,932 | 9/1973 | Cargile, Jr. | 37/67 |
| 3,800,949 | 4/1974 | Dural | 37/67 X |
| 3,983,707 | 10/1976 | Lezgintsov et al. | 37/73 X |
| 4,073,078 | 2/1978 | Leitz | 37/73 X |
| 4,102,064 | 7/1978 | Pot | 37/66 X |
| 4,204,347 | 5/1980 | Wolters | 37/73 X |
| 4,242,816 | 1/1981 | Jeanson | 37/67 |
| 4,310,975 | 1/1982 | Bibaut | 37/71 |

FOREIGN PATENT DOCUMENTS

| | | | |
|---|---|---|---|
| 1484523 | 6/1969 | Fed. Rep. of Germany | 37/67 |
| 7503910 | 10/1975 | Netherlands | 37/67 |

*Primary Examiner*—Clifford D. Crowder
*Attorney, Agent, or Firm*—Schrivener, Clarke, Schrivener and Johnson

[57] ABSTRACT

A working head which is in contact with the bottom of the body of water is mounted at one end of an arm hingedly connected at its other end to a carriage. The carriage is vertically displaceable on the anchoring device, at least in the lower portion of the latter, between a working position in which the arm forms a relatively small angle with the anchoring device and a position in which it is substantially parallel to the bottom of the body of water.

14 Claims, 4 Drawing Figures

APPLIANCE FOR DREDGING THE BOTTOM OF A BODY OF WATER

Matter enclosed in heavy brackets [ ] appears in the original patent but forms no part of this reissue specification; matter printed in italics indicates the additions made by reissue.

The present invention relates to an appliance for dredging the bottom of a body of water, e.g. for underwater earthdigging or for ore extraction at a great depth.

In the known dredging appliances, especially suction-dredging appliances, the working head which is in contact with the bottom of the body of water is mounted on the end of a rigid arm whose other end is hingedly connected to the hull of a buoyant body, such as for example a ship, so as to be rotatable about a horizontal axis. The working head is capable of performing dredging travel movements on the said bottom along a path in the form of an arc of circle, under the action of two circular dredging cables which are anchored to the bottom at points located on either side of the working head and pass through means fixedly assembled to the working head to thereafter wind round two winches mounted on the buoyant body and adapted to be actuated in the opposite direction of rotation. The positioning and advancing of the appliance are usually performed by means of two vertical anchoring piles movable vertically at the ends of the buoyant body. The advancing of the appliance is ensured by the rotation of the buoyant body about one of the two piles which is driven into the bottom of the body of water whereas the other pile is raised.

Such an appliance suffers from considerable drawbacks. Since the arm carrying the working head is hingedly connected directly to the hull of the buoyant body, such an appliance does not allow dredging at a great depth and its use is practically limited to depths of the order of 20 meters. Due to the fact that the arm is hingedly mounted at a stationary point of the buoyant body, the working head can perform but a single dredging travel movement in any stationary position of the appliance. It is obvious that the necessity of advancing the appliance by means of the two piles after each dredging travel is highly inconvenient.

It is a purpose of the present invention to provide a dredging appliance which does not suffer from the abovementioned drawbacks.

To this end, the dredging appliance according to the present invention, wherein an arm carrying a working head is hingedly connected to a support so as to be rotatable about a horizontal axis, and two pivoting dredging cables are provided to ensure each dredging travel movement along a path in the form of an arc of a circle, which are anchored to the bottom of the body of water at points located on either side, respectively, of the working head, outside the dredging path, and pass through means fixedly connected to the working head to thereafter wind round two winches mounted on the buoyant body, the latter being provided with at least one device for anchoring the buoyant body to the said bottom in a stationary working position, the said anchoring device being so mounted on the buoyant body as to be vertically movable between an anchoring position in which it is driven in the said bottom and a raised position outside the said bottom is characterized in that the arm carrying the working head is mounted on a support which is vertically movable on the anchoring device, at least in the lower portion of the latter, between a working position in which the said arm forms a relatively small angle with the anchoring device and a position in which it is substantially parallel to the said bottom.

According to another characterizing feature of the invention, the dredging appliance comprises an auxiliary anchoring device such as a pile, which is vertically movable between a position in which it is anchored to the bottom of the body of water and a raised position, the auxiliary anchoring device being shifted in position with respect to the main anchoring device in the direction or advance of the buoyant body, at a variable distance.

The invention will be better understood and other purposes, characterizing features, details and advantages thereof will appear more clearly from the following explanatory description made with reference to the appended diagrammatic drawings given solely by way of example illustrating one form of embodiment of the invention and wherein.

Figure 3:
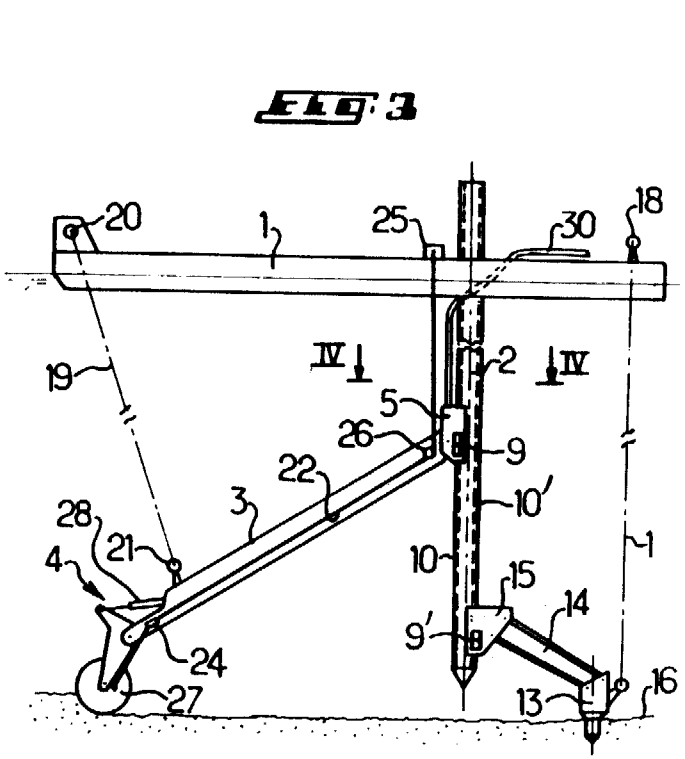
FIG. 3 is an elevational view of a dredging appliance according to the invention during its advance towards a new working position.

According to the embodiment illustrated in the appended Figures, the dredging appliance comprises a buoyant body 1 such as for example a catamaran boat, an anchoring device for the said boat in the form of a vertical pile 2 and a rigid arm 3 carrying at one end a working head 4 and hingedly connected at its other end to a support in the form of a carriage 5 mounted on and vertically movable along the pile 2.

Figure 4:
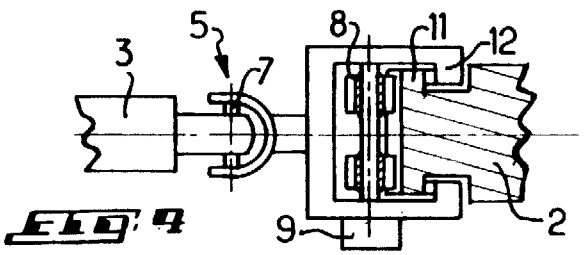
FIG. 4 is a diagrammatic sectional view, to a larger scale, taken along line IV—IV of FIG. 3.

As diagrammatically illustrated in FIG. 4, the arm 3 is connected to the supporting carriage 5 by a horizontal hinge pin 7.

To ensure its displacement along the anchoring pile 2, the carriage is provided with a set of pinions 8 driven by a motor 9 and each meshing with a toothed rack 10 extending along the pile 2. For the said carriage to be retained on the said pile, the latter may be provided with laterally protruding edges 11 behind which are engaged appropriate retaining elements 12 associated with the carriage and which are provided for example with rollers in rolling contact with the rear face of the protruding edges 11.

The dredging appliance according to the invention comprises an auxiliary vertical pile 13 which is connected by connecting means in the form of a parallel motion device 14 to a carriage 15 mounted on and vertically movable along the pile 2 in the same manner as the carriage 5. In the Figures, only the motor driving the carriage 15 and the associated toothed rack are represented at 9' and 10'. Furthermore, the auxiliary pile 13 is equipped with means allowing a rotary movement in a vertical plane about the hinged connection of the parallel motion device 14 to the carriage 15. Of course the connection between the parallel motion device 14 and the auxiliary pile 13 also allows a relative rotary movement of these two members. The actuating means for rotating the pile 13 are constituted by a cable 17 attached at one end to the pile and winding at its other end round a winch 18 mounted on the boat 1. It should also be noted that the auxiliary pile 13 is located substantially in the vertical plane containing the anchoring pile 2 and the arm 3 with the working head 4, but on the opposite side, with respect to the pile 2, of the working head 4.

For actuating the working head 4, the appliance comprises a cable 19 which is wound round a winch 20 on the boat 1 and is attached at 21 to the end of the arm 3 on which is mounted the working head 4. By means of this cable, the arm 3 can be rotated vertically about its horizontal hinge pin 7 connecting it to the supporting carriage 5. The device for rotating the arm 3 about a vertical axis comprises two pivoting dredging cables 22 anchored at 23 to the bottom 16 of the body of water, on either side, respectively, of the arm 3. Each cable 22 passes round a pulley 24 mounted at the lower or free end of the arm 3 and winding round a winch 25 mounted on the boat 1 after passing round a guide pulley 26 provided in the upper portion of the arm 3.

Figure 1:
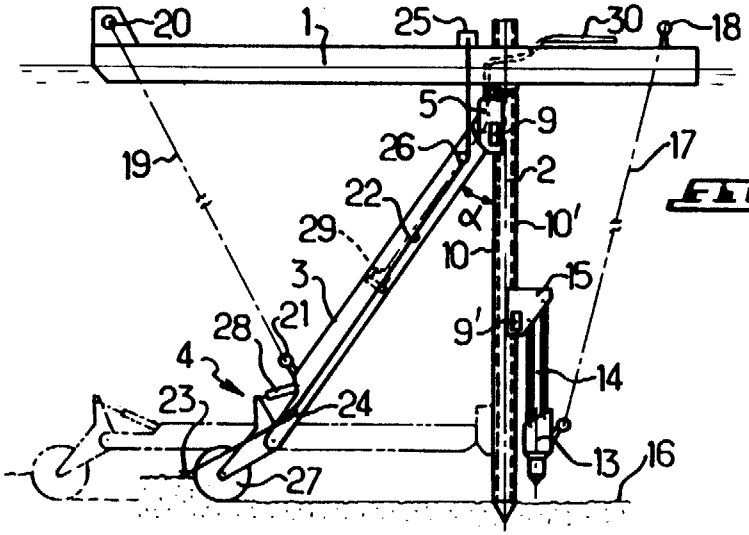
FIG. 1 is an elevational view of the dredging appliance according to the invention in its working position.

As appears particularly from FIGS. 1 and 3, the anchoring pile 2 is mounted at 34 on the boat 1 so as to be slidingly movable in the vertical direction between an anchoring position in which its lower end is driven into the bottom of the body of water (FIG. 1) and a raised position in which it is withdrawn from the said bottom (FIG. 3). The auxiliary pile 13 is also adapted to be driven into the bottom of the body of water or to be moved to a raised position.

It should also be noted that the working head 4 may be designed in the shape of a suction head equipped, if appropriate, with a cutting tool such as a bucket wheel 27 which can be held in position by a fluid-operated actuator 28. Associated with the suction head is a suction pump 29 mounted within the arm 3 and which forces the sucked materials through a conduit 30 for conveying the materials towards a storing location (not shown).

It should also be pointed out that the motors 9 and 9' intended for the displacement of the carriages 5 and 15 and the suction and delivery pump 29 as well as the actuator 28 may be operated by remote control, e.g. from the boat 1, in any appropriate and known manner.

The dredging appliance according to the invention operates as follows.

FIG. 1 shows the appliance in its stationary working position. The tip of the anchoring pile 2 is driven into the bottom 16 of the body of water. The carriage 5 to which is hingedly connected the arm 3 carrying the working head 4 is in its upper position. The carriage is maintained in this position for the whole duration of a dredging travel performed by the working head 4. The path of this dredging travel movement is in the form of an arc of circle shown at 31 in FIG. 2. This dredging movement of the head 4 along the arc of circle 31 is ensured by two winches 25 and two pivoting dredging cables 22. Depending upon the desired direction of movement during the dredging travel, one of the two cables 22 is wound round its winch 25 whereas the other cable is slackened by rotating the winch in the opposite direction of rotation synchronously with the rotation of the winch 25 operating in the direction of winding of its cable.

Figure 2:
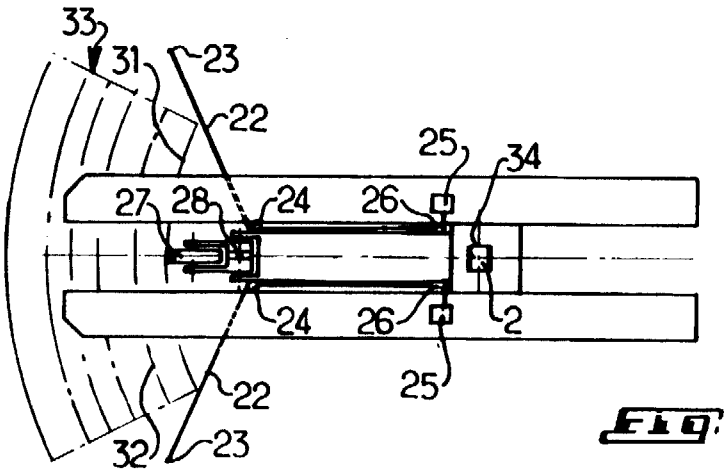
FIG. 2 is a top, partially broken-away view of the dredging appliance shown in FIG. 1.

After performing the dredging travel 31, the bucket wheel 27 of the working head 4 may be advanced to the line 32 representing the path of the next dredging travel movement, without it being necessary to displace the boat 1. To this end, it is sufficient to displace downwardly the carriage 5 to which is hingedly connected the arm 3 carrying the working head 4, over an appropriate distance. Indeed, any vertical displacement of the carriage 5 results in a movement of the bucket wheel 27 on the bottom of the body of water, forwardly or rearwardly depending upon the direction of displacement of the carriage 5, since the anchoring pile 2 is maintained fixed and the bucket wheel 27 is in contact with the bottom 16. Once the advancing movement of the wheel 27 is completed, the carriage 5 is immobilized and the working head 4 is made to perform the dredging travel movement along the arc of circle 32 by means of the winches 25 and the cables 22. It is easily understood that the working head 4 can thus sweep with successive parallel travel movements over an annular sector 33 (FIG. 2). The limit of this sweeping by means of successive parallel travels without changing the position of the boat 1 is reached when the carriage 5 is in the position illustrated in phantom lines in FIG. 1, in which the arm 3 extends horizontally. The exact position of the bucket wheel 27 can be adjusted by its fluid-operated actuator 28.

Only after the sweeping of the annular sector 33 (FIG. 2) must the boat be advanced towards its next stationary working position. The working head 4 with its bucket wheel 27 remains applied to the bottom 16 and constitutes a stationary point owing to its weight. The auxiliary pile 13 is lowered by displacing its supporting carriage 15 downwardly along the anchoring pile 2 and is driven into the bottom 16 of the body of water. Thereafter the anchoring pile 2 is lifted outside the bottom 16. The carriage 5 to which is hingedly connected the arm 3 carrying the working head 4 is then lifted by means of the motor 9 of the carriage, for example until the angle $\alpha$ between the axes of the pile 2 and the arm 3 reaches a value of about 45°. Owing to the fixedness of the heavy working head 4 on the bottom 16, the ascending movement of the carriage 5 results in the desired advancing of the boat 1. At the same time, the dredging cables 22 are maintained in the tightened state to prevent the working head 4 from skidding on the bottom and displacing rearwardly. Since the auxiliary pile 13 remains driven in the bottom 16 for the whole duration of the advancing of the boat 1, the latter is always anchored to the bottom of the body of water and the advancing operation is perfectly controllable.

When the boat reaches its new stationary working position, the anchoring pile 2 is again driven into the bottom and the auxiliary pile 13 is raised by means of its cable 17 and the winch 18. The carriage 15 is then moved upwardly along the pile 2 until the auxiliary pile 13 again reaches its position represented in FIG. 1. The advancing operation is thus completed and a further dredging operation can be started.

It is easily understood that the dredging appliance according to the invention allows working on the bottom of the body of water at depths of up to 100 meters and more and permits dredging by successive parallel travels without changing the working position of the appliance, owing in particular to the hinged connection of the arm carrying the working head to a driving carriage displaceable along the anchoring pile 2 down to the bottom 16 of the body of water.

The form of embodiment which has just been described and is illustrated in the Figures has been given by way of example only. Of course, many modifications may be introduced into this form of embodiment. The configuration of and the means of mounting the two carriages on the main anchoring pile 2 may be different and of any appropriate nature known in the art. Also, the working head is not limited to the structure described and illustrated. The boat may be equipped with an independent or additional propelling device to facilitate the advancing operation. It should also be noted that the anchoring pile may be designed in any appropriate manner and have any appropriate shape in cross-section. The end portion of the pile, intended to be driven into the bottom of the body of water, may be advantageously designed in the form of a separate member mounted rotatably and, if appropriate, vertically displaceable in the pile. The pile may be constituted by a plurality of sections capable of being inter-connected, so that it is adaptable to the depth of the bottom of the body of water.

The invention therefore comprises all means constituting technical equivalents to the means described, as well as their combinations, if the latter are carried out according to its gist and used within the scope of protection claimed.

What is claimed is:

1. Dredging appliance, [particularly for dredging at great water depths of up to 100 meters and more,] comprising: a buoyant body adapted to float on the water surface; an anchoring device vertically movably mounted in said buoyant body between an anchoring position wherein its lower end is driven into the water bottom and a raised position withdrawn from said bottom; a first support carriage supporting a working head carrying arm, said first carriage being slidably mounted on said anchoring device for vertical movement on said anchoring device; a working head carrying arm hingedly mounted at one of its ends on said first support carriage so as to be rotatable about a substantially horizontal axis, said working head carrying arm having a constant length; a working head carried by the other free end of said arm, said working head being adapted to dredge said bottom by accomplishing successive parallel dredging movements, each movement being along [a path in the form of an arc of circle] *an arcuate path*; and [control cables] *for means* moving said working head along each said dredging path; said first support carriage being vertically slidable along said anchoring device between an upper dredging position wherein the length of said working head carrying arm is such that said working head is in contact with said bottom with said working head carrying arm forming a relatively small angle with the vertical axis of said anchoring device, and a lower dredging position where said arm extends substantially horizontally, with said anchoring device remaining in its anchoring position driven in the water bottom and said working head being in contact with said bottom, said working head being movable during dredging in a direction perpendicular to the dredging paths by the vertical movement of said first carriage on said anchoring device [from] *between* said [upper] dredging [position to said lower dredging position] *positions* corresponding [thereby] to a multitude of parallel dredging paths.

2. Dredging appliance as recited in claim 1 wherein said upper dredging position of said first support carriage is located at an upper region of said anchoring device.

3. Dredging appliance as recited in claim 2 wherein with said first support carriage located at its upper position with said working head being in contact with said bottom, said small angle formed between said carrying arm and said vertical axis of said anchoring device is on the order of about 45°.

4. An appliance according to claim 1, wherein said working head comprises a suction head and wherein a suction pump is provided in the working head carrying arm to deliver the suctioned material into a conveying conduit partially extending in said arm.

5. An appliance according to claim 1, further comprising fluid-operated actuator means operable by remote control and mounted between the end of the arm and the working head for adjusting the position of said working head.

6. Dredging appliance, particularly for dredging at great water depths of up to 100 meters and more, comprising: a buoyant body adapted to float on the water surface; an anchoring device vertically movably mounted in said buoyant body between an anchoring position wherein its lower end is driven into the water bottom and a raised position withdrawn from said bottom; a first support carriage supporting a working head carrying arm, said first carriage being slidably mounted on said anchoring device for vertical movement on said anchoring device; a working head carrying arm hingedly mounted at one of its ends on said first support carriage so as to be rotatable about a substantially horizontal axis, said working head carrying arm having a constant length; a working head carried by the other free end of said arm, said working head being adapted to dredge said bottom by accomplishing successive parallel dredging movements, each movement being along a path in a form of an arc of circle; and control cables for moving said working head along each said dredging path; said first support carriage being vertically slidable along said anchoring device between an upper dredging position wherein the length of said working head carrying arm is such that said working head is in contact with said bottom with said working head carrying arm forming a relatively small angle with the vertical axis of said anchoring device, and a lower dredging position where said arm extends substantially horizontally, with said anchoring device remaining in its anchoring position driven in the water bottom and said working head being in contact with said bottom, said working head being movable in a direction perpendicular to the dredging paths by the vertical movement of said first carriage on said anchoring device from said upper dredging position to said lower dredging position corresponding thereby to a multitude of parallel dredging paths, said arm having a constant length; an auxiliary anchoring device coupled by coupling means to said anchoring device, said auxiliary anchoring device being vertically displaceable between an anchoring position wherein its lower end is driven into the water bottom and a raised position withdrawn from said water bottom, said coupling means and said auxiliary anchoring device together constituting means for advancing the dredging appliance from one dredging position to a next successive position in a direction substantially perpendicular to said dredging paths of said working head on the water bottom, said working head having a weight and said coupling means being adapted to ensure the advancement of the dredging appliance from one dredging position to the next one by moving said first carriage from its lower position to its upper position on said anchoring device with said working head remaining substantially fixed on said water bottom, said anchoring device being in its raised position, said auxiliary anchoring device being in said anchoring position and the distance between the two anchoring devices varying from a smallest to a greatest value.

7. An appliance according to claim 6, wherein said auxiliary anchoring device comprises a pile.

8. An appliance according to claim 6, wherein said coupling means are constituted by a second carriage mounted on and vertically movable along said anchoring device and by a parallel motion device of variable shape hingedly connected respectively to said second carriage and said auxiliary anchoring device.

9. An appliance according to claim 8, wherein said first support carriage and said second carriage are displaceable on said anchoring device each by a toothed rack provided on said anchoring device and pinion and motor means provided on each first and second carriage.

10. An appliance according to claim 6, wherein said auxiliary anchoring device is controlled by means of a cable and a winch mounted on the floating body.

11. Dredging appliance, particularly for dredging at great water depths of up to 100 meters and more, comprising: a buoyant body adapted to float on the water surface; a single anchoring pile vertically movably mounted in said buoyant body between an anchoring position wherein its lower end is driven into the water bottom and a raised position withdrawn from said bottom; a first carriage supporting a working head carrying arm, said first carriage being slidably mounted on said single anchoring pile for vertical movement on said single anchoring pile; a working head carrying arm hingedly mounted at one of its ends on said first support carriage so as to be rotatable about a substantially horizontal axis; a working head carried by the other free end of said arm, said working head being adapted to dredge said bottom by accomplishing successive parallel dredging movements, each movement being along a path in a form of an arc of circle; and control cables for moving said working head along each said dredging path; said first support carriage being vertically slidable along said single anchoring pile between an upper dredging position located in the upper portion of the single anchoring pile and wherein with said working head being in contact with said bottom said working head carrying arm forms a relatively small angle with the vertical axis of said single anchoring pile, said angle being on the order of about 45°, and a lower dredging position where said arm extends substantially horizontally, with said single anchoring pile remaining in its anchoring position driven into the water bottom and said working head being in contact with said bottom, said working head being movable *during dredging* in a direction perpendicular to the dredging paths by the vertical movement of said first carriage on said single anchoring pile from said upper to said lower dredging position corresponding to a multitude of parallel dredging paths, said arm having a constant length.

12. Dredging appliance according to claim 11, wherein said control cables comprise a pair of cables anchored to the bottom of the water at points located on either side, respectively, of the working head, outside the path of the dredging travel and pass through means provided on the working head and wherein cable operating means are provided, said cable operating means comprising winches mounted on the buoyant body.

13. Method for dredging a water bottom[, particularly for dredging at great water depths of up to 100 meters and more,] comprising the steps of:

providing a dredging appliance comprising a buoyant body adapted to [fload] *float* on the water surface; an anchoring device vertically movably mounted in said buoyant body between an anchoring position wherein its lower end is driven into the water bottom and a raised position withdrawn from said bottom; a first support carriage supporting a working head carrying arm, said first carriage being slidably mounted on said anchoring device for vertical movement on said anchoring device; a working head carrying arm hingedly mounted at one of its ends on said first support carriage so as to be rotatable about a substantially horizontal axis; a working head carried by the other free end of said arm, said working head being adapted to dredge said bottom by accomplishing successive parallel dredging movements, each movement being along [a] *an arcuate* path [in a form of an arc of circle]; and [control cables] *means* for moving said working head along each said dredging path; said first support carriage being vertically slidable along said anchoring device between an upper dredging position wherein with said working head being in contact with said bottom said working head carrying arm forms a relatively small angle with the vertical axis of said anchoring device, and a lower dredging position where said arm extends substantially horizontally, with [sand] *said* anchoring device remaining in its anchoring position driven in the water bottom and said working head being in contact with said bottom, said working head being movable in a direction perpendicular to the dredging path by the vertical movement of said first carriage on said anchoring device [from] *between* said [upper] dredging [positions to said lower dredging position] *positions* corresponding thereby to a multitude of parallel dredging paths, said arm having a constant length;

placing said working head carrying arm support carriage in [its upper position] *one of said dredging positions* on said anchoring device, driving the lower end of said anchoring device into the water bottom, causing the working head to accomplish a dredging operation by moving it along [a dredging path in the form of an arc of a circle,] *an arcuate path* after the end of said dredging operation moving said first carriage vertically on said anchoring device while keeping said working head on the water bottom, by a distance predetermined to cause said working head to [advance] *move* from one dredging path position to the position of the next successive dredging path, causing said working head to again accomplish the dredging operation by moving along the dredging path, and repeating these steps of vertically moving the first carriage and causing the working head to accomplish a dredging operation until said first carriage reaches its [lower] *other* dredging position [in which the working head carrying arm is in its substantially horizontal position].

14. Method for advancing a dredging appliance comprising a buoyant body adapted to float on the water surface; an anchoring device vertically movably mounted in said buoyant body between an anchoring position wherein its lower end is driven into the water bottom and a raised position withdrawn from said bottom; a first support carriage supporting a working head carrying arm, said first carriage being slidably mounted on said anchoring device for vertical movement on said anchoring device; a working head carrying arm hingedly mounted at one of its ends of said first support carriage so as to be rotatable about a substantially horizontal axis; a working head carried by the other free end of said arm, said working head being adapted to dredge said bottom by accomplishing successive parallel dredging movements, each movement being along a path in a form of an arc of circle; and control cables for moving said working head along each said dredging path; said first support carriage being vertically slidable along said anchoring device between an upper dredging position wherein with said working head being in contact with said bottom said working head carrying arm forms a relatively small angle with the vertical axis of said anchoring device, and a lower dredging position where said arm extends substantially horizontally, with said anchoring device remaining in its anchoring position driven in the water bottom and said working head being in contact with said bottom, said working head being movable in a direction perpendicular to the dredging paths by the vertical movement of said first carriage on said anchoring device from said upper dredging position to said lower dredging position corresponding thereby to a multitude of parallel dredging paths, said arm having a constant length; an auxiliary anchoring device coupled by coupling means to said anchoring device, said auxiliary anchoring device being vertically displaceable between an anchoring position wherein its lower end is driven into the water bottom and a raised position withdrawn from said water bottom, said coupling means allowing the distance between the anchoring device and the auxiliary device to be varied in the direction of advancement of the dredging appliance from one dredging position to a next successive position perpendicular to said dredging paths of said working head on the water bottom, said working head having a weight and said coupling means being adapted to ensure the advancement of the dredging appliance from one dredging position to the next one by moving said first carriage from its lower position to its upper position on said anchoring device with said working head remaining substantially fixed on said water bottom, said anchoring device being in its raised position, said auxiliary anchoring device being in said anchoring position and the distance between the two anchoring devices varying from a smallest to a greatest value; comprising the steps of:

successively driving said auxiliary device into the water bottom at a minimum distance from the anchoring device;

withdrawing said anchoring device from said water bottom, moving said support carriage from its lower position to its upper position on said anchoring device with said working head remaining substantially fixed on the water bottom, driving said anchoring device again into the water bottom when said carriage is in its upper position, and withdrawing said auxiliary device from the water bottom.

* * * * *